(12) United States Patent
    Orf

(10) Patent No.: US 12,631,288 B2
(45) Date of Patent: May 19, 2026

(54) TELEVISION MOUNT WITH MOTION CONTROL FEATURES

(71) Applicant: Legrand AV Inc., Eden Prairie, MN (US)

(72) Inventor: Nathan Orf, Minneapolis, MN (US)

(73) Assignee: LEGRAND AV, INC., Minnetonka, MN (US)

( * ) Notice: Subject to any disclaimer, the term of this patent is extended or adjusted under 35 U.S.C. 154(b) by 57 days.

(21) Appl. No.: 18/662,371

(22) Filed: May 13, 2024

(65) Prior Publication Data

US 2024/0377021 A1 Nov. 14, 2024

Related U.S. Application Data

(60) Provisional application No. 63/465,930, filed on May 12, 2023.

(51) Int. Cl.
    F16M 11/08 (2006.01)
    F16M 11/06 (2006.01)
    (Continued)

(52) U.S. Cl.
    CPC ............ F16M 13/02 (2013.01); F16M 11/10 (2013.01); F16M 11/2021 (2013.01);
    (Continued)

(58) Field of Classification Search
    CPC ............ Y10S 248/917; Y10S 248/919; Y10S 248/92; Y10S 248/918; F16M 11/06; F16M 11/08; F16M 2200/06; F16M 2200/063
    See application file for complete search history.

(56) References Cited

U.S. PATENT DOCUMENTS

| | | | | |
|---|---|---|---|---|
| 11,849,246 | B1 * | 12/2023 | Massey | F16M 11/2092 |
| 2023/0016449 | A1 * | 1/2023 | Newville | F16M 11/048 |
| 2024/0183485 | A1 * | 6/2024 | You | F16M 11/2021 |

FOREIGN PATENT DOCUMENTS

EP 4464925 A1 11/2024

OTHER PUBLICATIONS

European Patent Office, Communication from corresponding European Patent App. No. 24175451.4, European Search Report dated Oct. 18, 2024, 9 pages.

(Continued)

*Primary Examiner* — Alfred J Wujciak
(74) *Attorney, Agent, or Firm* — Bradley J. Thorson; DeWitt LLP

(57) ABSTRACT

A full-motion television mount having features enabling the use of televisions outdoors by controlling the motion of the mount to alleviate the effects of wind and other inadvertent shifting. The motion control features can include one or more motion control arms pivotally coupled to a wall interface of the mount and slidably coupled to an arm assembly of the mount through a friction control, wherein the friction control is selectively adjustable to increase and decrease sliding friction between the motion control arm and the arm assembly. Also, the motion control features can include one or more wrist motion controls operably coupled between the arm assembly and the television interface, wherein the wrist motion controls are selectively adjustable to increase and decrease friction between the television interface and the arm assembly.

16 Claims, 7 Drawing Sheets

(51) Int. Cl.
  *F16M 11/10*          (2006.01)
  *F16M 11/20*          (2006.01)
  *F16M 11/24*          (2006.01)
  *F16M 13/02*          (2006.01)

(52) U.S. Cl.
  CPC ....... *F16M 11/2092* (2013.01); *F16M 11/247*
       (2013.01); *F16M 11/06* (2013.01); *F16M*
                        *11/08* (2013.01)

(56)            References Cited

OTHER PUBLICATIONS

European Patent Office, Communication from corresponding Euro-
pean Patent App. No. 24175451.4, Communication pursuant to
Article 94(3) EPC dated Sep. 16, 2025, 6 pages.

* cited by examiner

TELEVISION MOUNT WITH MOTION CONTROL FEATURES

RELATED APPLICATION

The present application claims the benefit of U.S. Provisional Application No. 63/465,930 filed May 12, 2023, said application being hereby incorporated herein in its entirety by reference.

TECHNICAL FIELD

The invention is related to television mounts, and more specifically full motion television mounts.

BACKGROUND

Flat screen televisions and monitors, such as those using LCD, LED, or OLED technology, have become very common. Such devices can provide a large, lightweight, high performance display screen that is also very thin. As technology has improved and prices have decreased, it has become affordable for many consumers to mount televisions in multiple convenient locations, including outdoors.

It is often desirable for televisions to be freely maneuverable to adjust the orientation of the screen to fit user preferences. For this reason, mounts often have extendable arms and tilt and swivel capability—referred to in the industry as "full-motion" mounts. A problem with prior art full-motion mounts, however, is that when used outdoors, the television can be buffeted by winds, causing the television to shift from its set position, or even to be blown so far as to collide with building structure and be damaged. Also, such mounts are subject to other external forces, such as inadvertent bumping by people or objects that can cause similar shifting and damage.

What is needed is a full-motion television mount that has features enabling use outdoors by controlling the motion of the mount to alleviate the effects of wind and in locations where it is desirable to selectively limit motion of the mount to prevent undesirable shifting and damage to the display or mount.

SUMMARY OF THE DISCLOSURE

According to embodiments of the inventions, a full-motion television mount, systems, and methods that have features enabling the use of televisions outdoors by controlling the motion of the mount to alleviate the effects of wind and other inadvertent shifting are disclosed herein. The motion control features can include one or more motion control arms pivotally coupled to a wall interface of the mount and slidably coupled to an arm assembly of the mount through a friction control, wherein the friction control is selectively adjustable to increase and decrease sliding friction between the motion control arm and the arm assembly, thereby selectively limiting shifting of the arm assembly relative to the wall interface. Also, the motion control features can include one or more wrist motion controls operably coupled between the arm assembly and the television interface, wherein the wrist motion control is selectively adjustable to increase and decrease friction between the television interface and the arm assembly, thereby selectively limiting shifting of the television interface relative to the arm assembly.

According to an embodiment, a television mount includes a wall interface adapted to attach to a wall, a television interface adapted to attach to a television, an arm assembly having a first end pivotally coupled to the wall interface and a second end pivotally coupled to the television interface, and a motion control arm pivotally coupled to the wall interface and slidably coupled to the arm assembly through a friction control, wherein the friction control is selectively adjustable to increase and decrease sliding friction between the motion control arm and the arm assembly, thereby selectively limiting shifting of the arm assembly relative to the wall interface. The television mount can further include a wrist motion control operably coupled between the arm assembly and the television interface, wherein the wrist motion control is selectively adjustable to increase and decrease friction between the television interface and the arm assembly, thereby selectively limiting shifting of the television interface relative to the arm assembly.

According to embodiments, the arm assembly can include a single articulating arm or a pair of articulating arms. The television mount can include a tilt head assembly operably coupling the television interface and the arm assembly, wherein the tilt head assembly enables selective tilting of the television interface and an attached television relative to the arm assembly and wall interface. The television interface can be selectively tiltable about a generally horizontal virtual tilt axis positioned forwardly from the television interface. The motion control arm can define a slot, and the friction control can thread into the arm assembly.

In further embodiments, a television mount includes a wall interface adapted to attach to a wall, a television interface adapted to attach to a television, an arm assembly having a first end pivotally coupled to the wall interface and a second end pivotally coupled to the television interface, and a wrist motion control operably coupled between the arm assembly and the television interface, wherein the wrist motion control is selectively adjustable to increase and decrease friction between the television interface and the arm assembly, thereby selectively limiting shifting of the television interface relative to the arm assembly. The television mount can further include a motion control arm pivotally coupled to the wall interface and slidably coupled to the arm assembly through a friction control, wherein the friction control is selectively adjustable to increase and decrease sliding friction between the motion control arm and the arm assembly, thereby selectively limiting shifting of the arm assembly relative to the wall interface.

In embodiments, the arm assembly can include a single articulating arm or a pair of articulating arms. The television mount can include a tilt head assembly operably coupling the television interface and the arm assembly, wherein the tilt head assembly enables selective tilting of the television interface and an attached television relative to the arm assembly and wall interface. The television interface can be selectively tiltable about a generally horizontal virtual tilt axis positioned forwardly from the television interface. The wrist motion control can include a guide bracket defining a slot, the guide bracket operably coupled to the television interface, and a follower bracket attached to the arm assembly, a friction control extending through the slot and threaded into the arm assembly.

In embodiments, a television mount includes a wall interface adapted to attach to a wall, a television interface adapted to attach to a television, an arm assembly having a pair of articulating arms, each articulating arm having a first end pivotally coupled to the wall interface and a second end pivotally coupled to the television interface, a pair of motion control arms pivotally coupled to the wall interface, each one of the motion control arms slidably coupled to a separate one of the articulating arms through a separate friction control, wherein each friction control is selectively adjustable to increase and decrease sliding friction between the respective motion control arm and the articulating arm, thereby selectively limiting shifting of the articulating arm relative to the wall interface, and a pair of wrist motion controls, each wrist motion control operably coupled between a separate one of the articulating arms and the television interface, wherein the wrist motion control is selectively adjustable to increase and decrease friction between the television interface and the articulating arm, thereby selectively limiting shifting of the television interface relative to the articulating arm.

Each wrist motion control can include a guide bracket defining a slot, the guide bracket operably coupled to the television interface, and a follower bracket attached to the respective articulating arm, a friction control extending through the slot and threaded into the articulating arm. The television mount can further include a tilt head assembly operably coupling the television interface and the articulating arms, wherein the tilt head assembly enables selective tilting of the television interface and an attached television relative to the articulating arms and the wall interface. The television interface can be selectively tiltable about a generally horizontal virtual tilt axis positioned forwardly from the television interface.

The summary above is not intended to describe each illustrated embodiment or every implementation of the present disclosure. The figures and the detailed description that follow more particularly exemplify these embodiments.

BRIEF DESCRIPTION OF THE DRAWINGS

The subject matter hereof may be more completely understood in consideration of the following detailed description of various embodiments in connection with the accompanying drawings, in which.

4

Figures 7A, 7B, 7C, 7D:
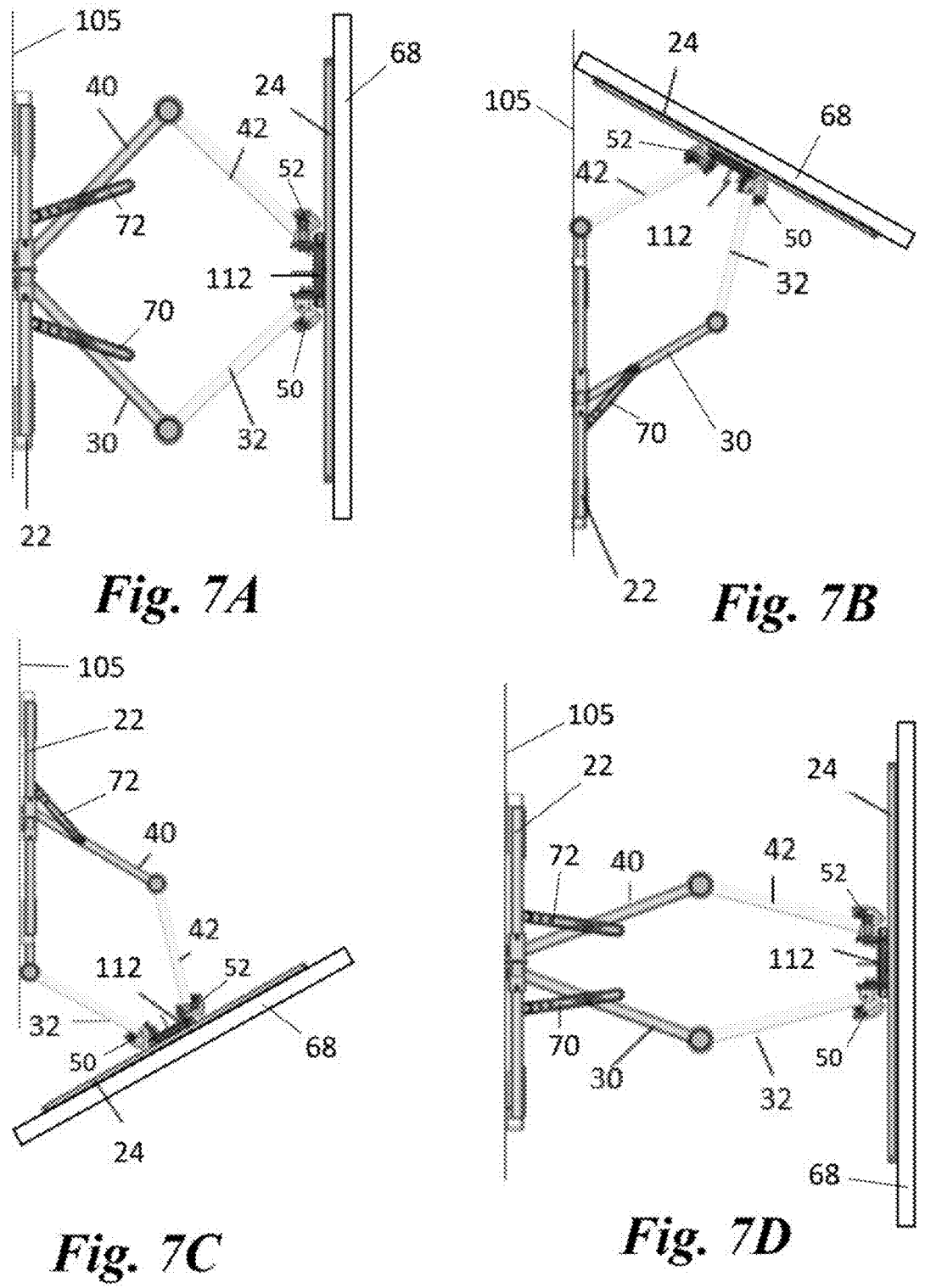
FIG. 7A is a top plan view of the mount of FIG. 1, depicting the mount in a position in which the articulating arms are positioned in a partially extended position and the television interface is parallel to the wall.

FIG. 7B is a top plan view of the mount of FIG. 7A, depicting the mount in a position in which the articulating arms are positioned so that the television interface is at one limit of horizontal travel;

FIG. 7C is a top plan view of the mount of FIG. 7A, depicting the mount in a position in which the articulating arms are positioned so that the television interface is at the other limit of horizontal travel; and FIG. 7D is a top plan view of the mount of FIG. 7A, depicting the mount in a position in which the articulating arms are positioned in a nearly fully extended position and the television interface is parallel to the wall.

While various embodiments are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure as defined by the appended claims.

DETAILED DESCRIPTION

As depicted in FIGS. 1-7D, television mount 20 generally includes wall interface 22, television interface 24, coupled by arm assembly 25. Arm assembly 25 has a first end 27 and an opposing second end 29, and generally includes articulating swing arm assemblies 26, 28. Swing arm assembly 26 generally includes inner arm 30 and outer arm 32. Inner arm 30 is pivotally coupled to wall interface 22 at pivot post 34, and pivotally coupled to outer arm 32 at joint 36. Outer arm 32 is pivotally coupled to flange 54 with pivot pin 38. Swing arm assembly 28 generally includes inner arm 40 and outer arm 42. Inner arm 40 is pivotally coupled to wall interface 22 at pivot post 44, and pivotally coupled to outer arm 42 at joint 46. Outer arm 42 is pivotally coupled to flange 55 with pivot pin 48.

Wall interface 22 generally includes upper cross member 100, lower cross member 102, and central column 104. Upper cross member 100 and lower cross member 102 can be secured to a wall 105 with fasteners (not depicted) to secure television mount 20 in place on wall 105. Pivot posts 34, 44, are mounted in front of central column 104, and are pivotally coupled between upper cross member 100 and lower cross member 102 in bearing blocks 107, 109.

Television interface 24 generally includes upper cross member 106, lower cross member 108, and central column 110. A tilt head assembly including tilt bracket 112 is attached to rear face 114 of central column 110 and includes front wall 116 with rearwardly projecting flanges 118, 120. Each flange 118, 120, defines guide slots 122, 124, which receive followers 126, 128 carried by flanges 54, 55. Followers 126, 128, can slide or roll in guide slots 122, 124. Guide slots 122, 124, are defined and oriented such that tilt bracket 112, and the attached central column 110, can tilt about a generally horizontal virtual tilt axis Y-Y spaced apart forwardly from front faces 130, 132, of upper cross member 106 and lower cross member 108, respectively. It will be appreciated that if guide slots 122, 124, are arcuate and oriented along the circumference of a circle with a center at horizontal virtual tilt axis Y-Y as depicted, the tilt axis will be stationary. Guide slots 122, 124, however, can be straight or virtually any other geometric shape that causes the motion of television interface 24 to tilt about an instantaneous center or axis of rotation. Hence, horizontal virtual tilt axis Y-Y can shift continuously during rotation according to well-known principles of machine kinematics. It is preferable that horizontal virtual tilt axis Y-Y is positioned such that it passes through a television 68 attached to television interface 24, thereby making television 68 "self-balancing" about horizontal virtual tilt axis Y-Y, reducing the need for friction controls to hold television 68 in a desired tilt position.

Television 68 can be attached directly to upper cross member 106 and lower cross member 108 with fasteners (not depicted). Alternatively, television 68 can be attached to hook brackets (not depicted), which hook over upper cross member 106 and lower cross member 108 to enable television 68 to be easily attached and detached from television interface 24 without the need to remove fasteners.

Figure 1:
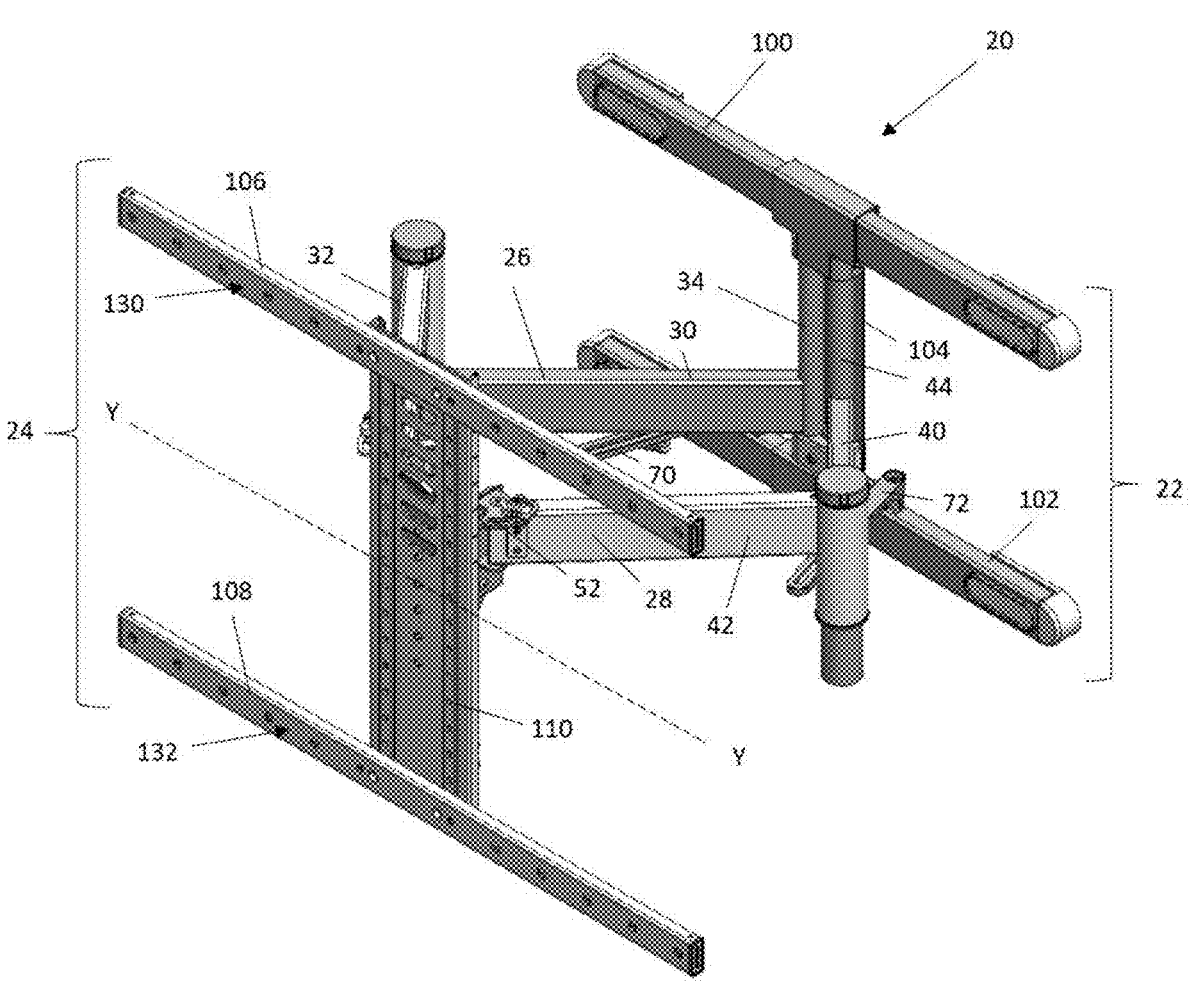
FIG. 1 is a front isometric view of a television mount according to an embodiment of the invention.
Figure 2:
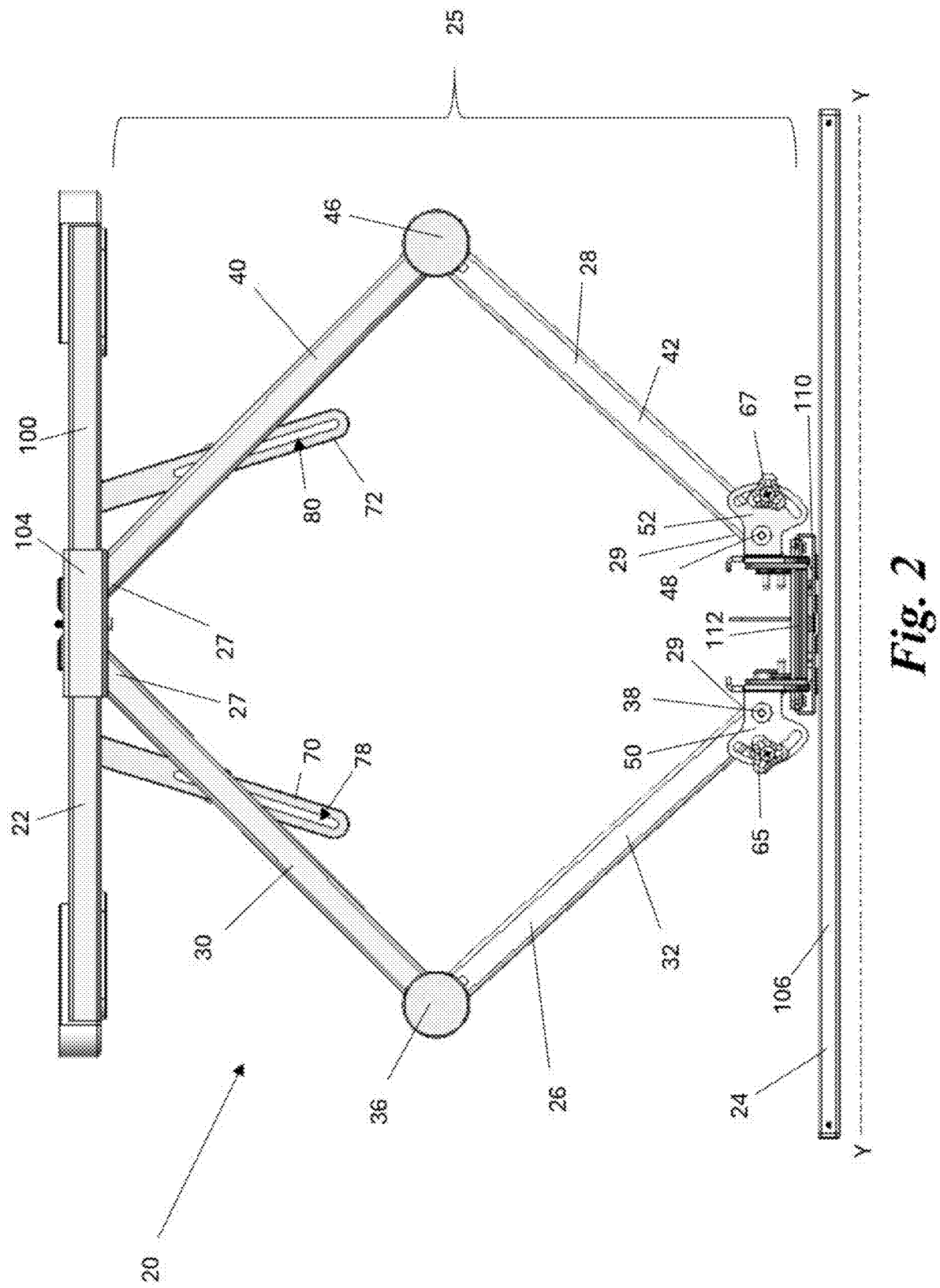
FIG. 2 is a top plan view of the mount of FIG. 1.
Figure 3:
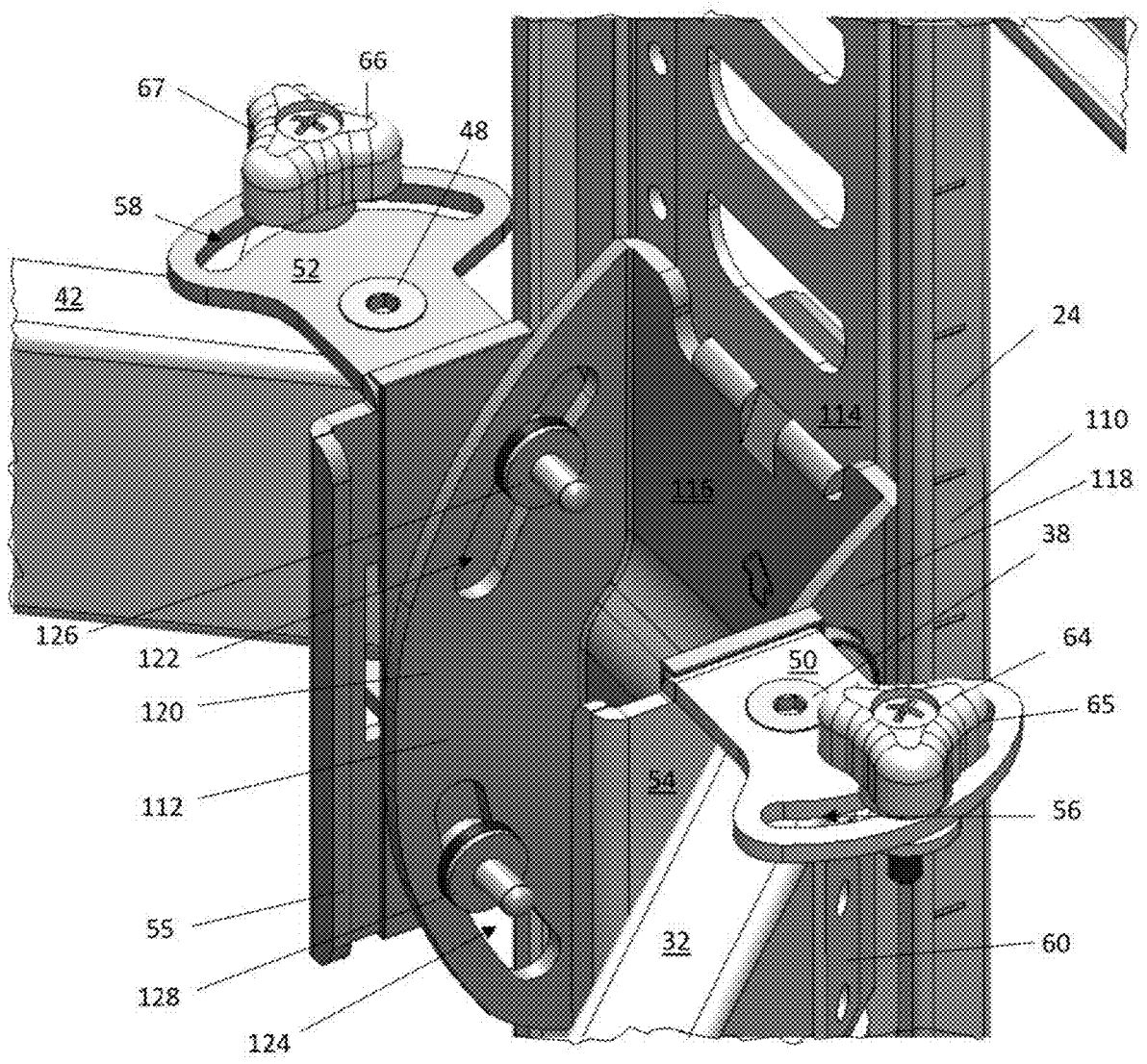
FIG. 3 is a top isometric view of a portion of the mount of FIG. 1, depicting a first "wrist" motion control feature.
Figure 5:
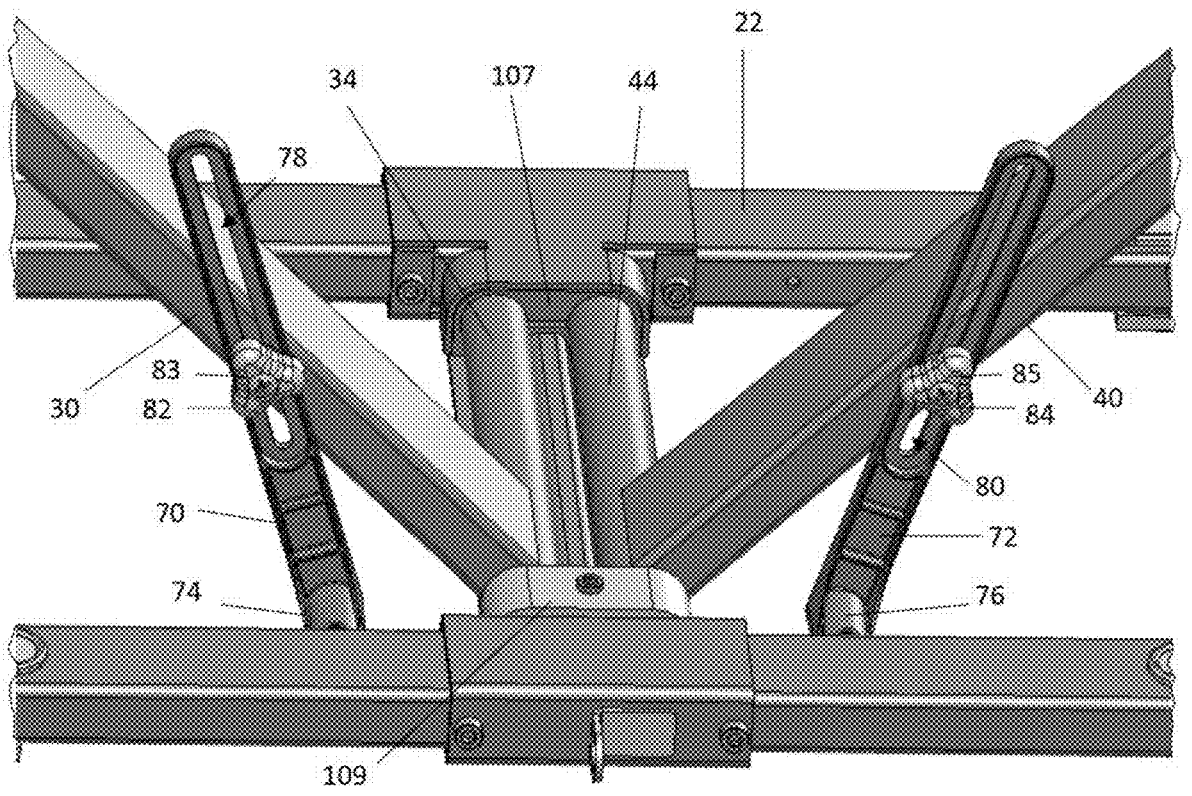
FIG. 5 is a bottom isometric view of a portion of the mount of FIG. 1, depicting another of the motion control features of the mount.

A first aspect—"wrist" motion control according to embodiments of the invention—is depicted in FIGS. 2, 3, and 5. Guide brackets 50, 52, project outwardly from flanges 54, 55, of television interface 24, and define slots 56, 58, respectively. Follower brackets 60, 62, are fixed to outer arms 32, 42, respectively. Follower brackets 60, 62, are threaded to receive friction controls 64, 66, respectively, which pass through slots 56, 58, as depicted. Knobs 65, 67, enable selective tightening and loosening of friction controls 64, 66, respectively.

Figure 6A:
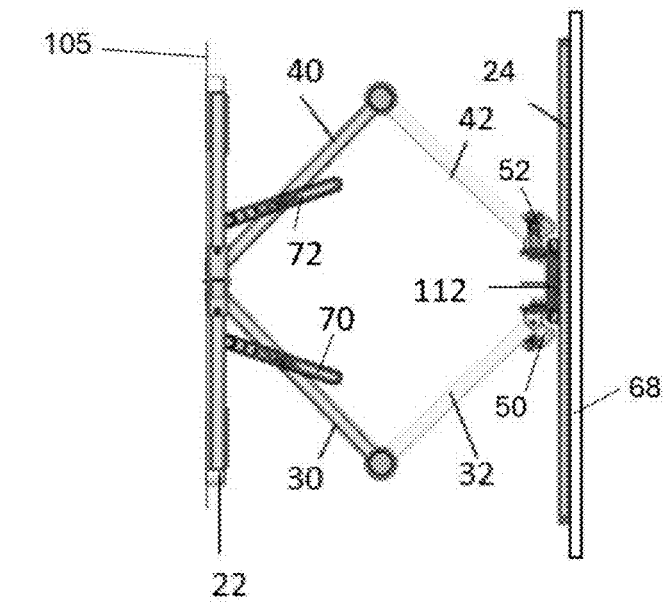
FIG. 6A is a top plan view of the mount of FIG. 1, depicting the mount in a first position in which the television interface is positioned in a first "wrist" orientation.
Figure 6B:
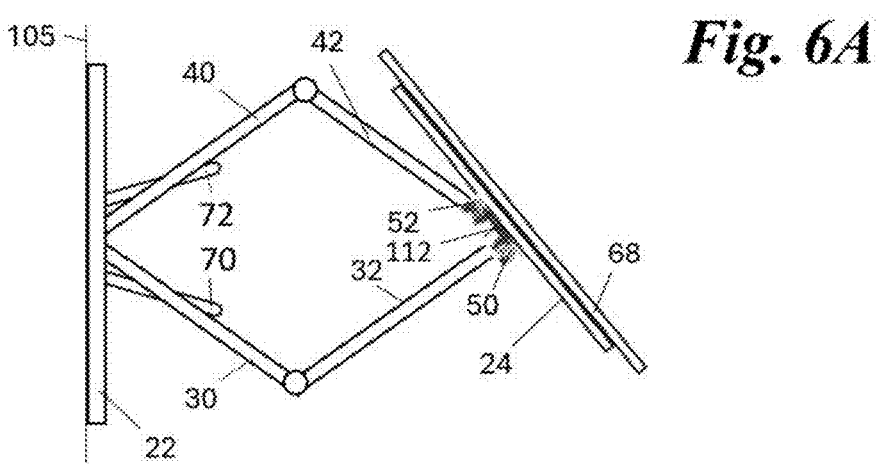
FIG. 6B is a top plan view of the mount of FIG. 6A, depicting the mount in a second position in which the television interface is positioned in another "wrist" orientation in which the television interface is shifted toward one of the limits of travel.
Figure 6C:
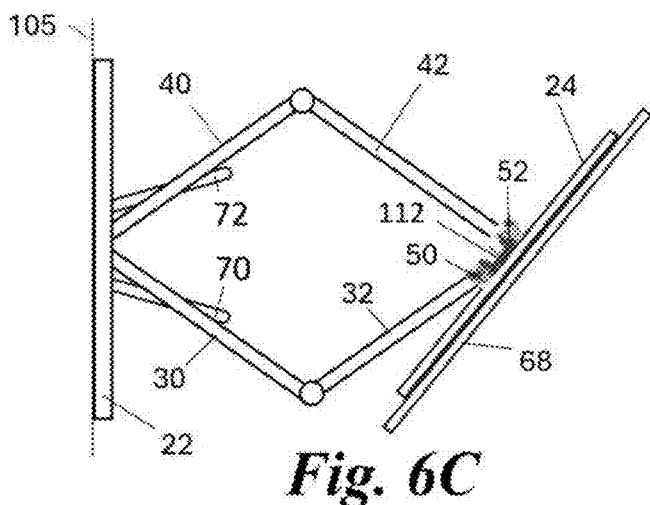
FIG. 6C is a top plan view of the mount of FIG. 6A, depicting the mount in a third position in which the television interface is positioned in another "wrist" orientation in which the television interface is shifted toward the other of the limits of travel.

In use, with friction controls 64, 66, loosened, television interface 24 can freely pivot relative to outer arms 32, 42, to enable television 68 to be positioned as desired as depicted in FIGS. 6A-6C. When it is desired to inhibit movement of television 68, for example when the mount 20 and television 68 are subject to wind or other external forces, friction controls 64, 66, can be tightened to add friction to inhibit motion of television 68. In this way, television 68 can remain in the desired position and not be shifted by wind or inadvertent bumping.

Figure 4:
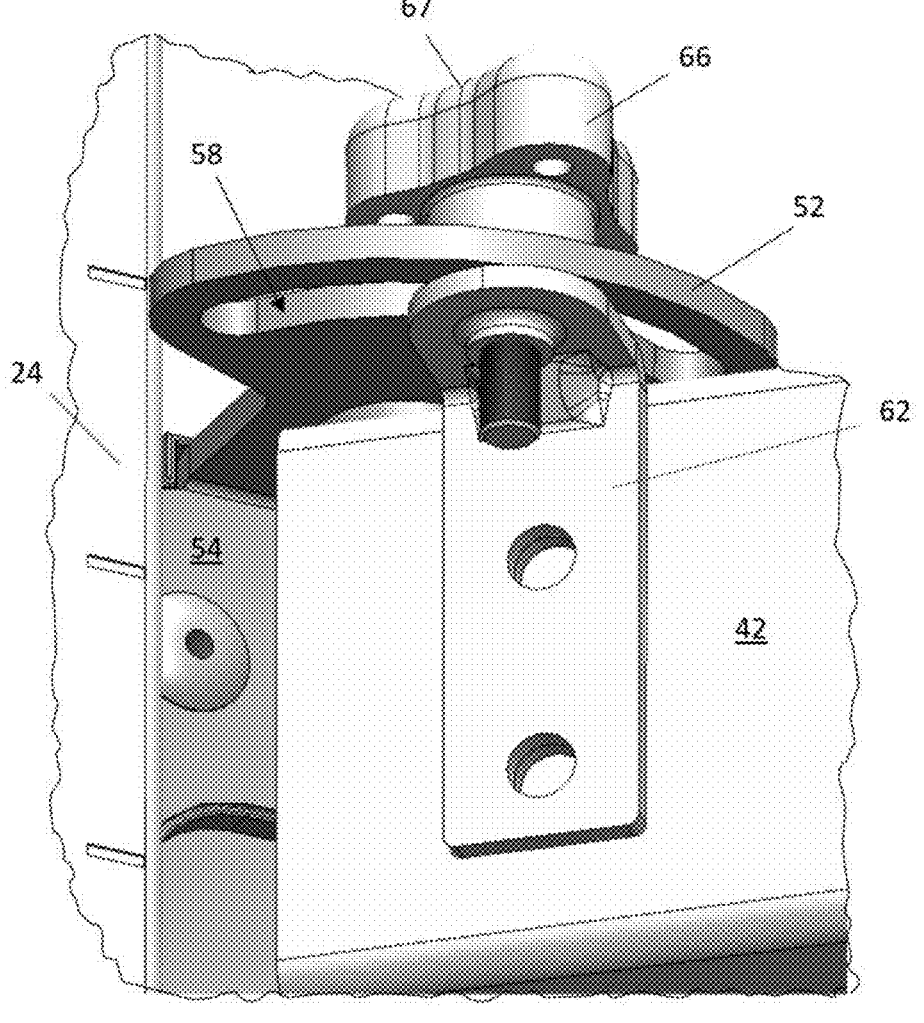
FIG. 4 is a bottom isometric view of the one of the "wrist" motion control features of FIG. 3.

A second aspect of motion control according to embodiments of the invention is depicted in FIGS. 4 and 5. Motion control arms 70, 72, are pivotally coupled to wall interface 22 at pivots 74, 76, respectively. Motion control arms 70, 72, define slots 78, 80, respectively. Friction controls 82, 84, extend through slots 78, 80, and thread into lower arm 30 and lower arm 40 respectively. Knobs 83, 85, enable selective tightening and loosening of friction controls 82, 84, respectively.

In use, with friction controls 82, 84, loosened, arm assemblies 26, 28, can freely articulate and pivot relative to wall interface 22, enabling television 68 to be positioned as desired as depicted in FIGS. 7A-7D. When it is desired to inhibit movement of television 68, for example when the mount 20 and television 68 are subjected to wind or other external forces, friction controls 82, 84, can be tightened to add friction to inhibit motion of television 68. In this way, television 68 can remain in the desired position and not be shifted by wind or inadvertent bumping.

It will be appreciated that although the depicted embodiment has an arm assembly 25 including two articulating swing arm assemblies 26, 28, other embodiments are contemplated where arm assembly 25 includes only one articulating swing arm assembly, or a single non-articulating arm. The same "wrist" motion control, and/or a motion control arm may be applied to such embodiments with similar effect as described above.

Various embodiments of systems, devices, and methods have been described herein. These embodiments are given only by way or example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of difference individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one of more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of 35 U.S.C. § 112(f) are not to be invoked unless the specific terms "means for" or "step for" are recited in a claim.

What is claimed is:

1. A television mount comprising:
a wall interface adapted to attach to a wall;
a television interface adapted to attach to a television;
an arm assembly having a first end pivotally coupled to the wall interface and a second end pivotally coupled to the television interface; and
a motion control arm pivotally coupled to the wall interface and slidably coupled to the arm assembly through a friction control, wherein the friction control is selectively adjustable to increase and decrease sliding friction between the motion control arm and the arm assembly, thereby selectively limiting shifting of the arm assembly relative to the wall interface, wherein the motion control arm defines a slot, and wherein the friction control threads into the arm assembly.

2. The television mount of claim 1, further comprising a wrist motion control operably coupled between the arm assembly and the television interface, wherein the wrist motion control is selectively adjustable to increase and decrease friction between the television interface and the arm assembly, thereby selectively limiting shifting of the television interface relative to the arm assembly.

3. The television mount of claim 1, wherein the arm assembly comprises a single articulating arm.

4. The television mount of claim 1, wherein the arm assembly comprises a pair of articulating arms.

5. The television mount of claim 1, further comprising a tilt head assembly operably coupling the television interface and the arm assembly, wherein the tilt head assembly enables selective tilting of the television interface and an attached television relative to the arm assembly and wall interface.

6. The television mount of claim 5, wherein the television interface is selectively tiltable about a generally horizontal virtual tilt axis positioned forwardly from the television interface.

7. A television mount comprising:

a wall interface adapted to attach to a wall;

a television interface adapted to attach to a television;

an arm assembly having a first end pivotally coupled to the wall interface and a second end pivotally coupled to the television interface; and a wrist motion control operably coupled between the arm assembly and the television interface, wherein the wrist motion control is selectively adjustable to increase and decrease friction between the television interface and the arm assembly, thereby selectively limiting shifting of the television interface relative to the arm assembly, wherein the wrist motion control comprises a guide bracket defining a slot, the guide bracket operably coupled to the television interface, and a follower bracket attached to the arm assembly, a friction control extending through the slot and threaded into the arm assembly.

8. The television mount of claim 7, further comprising a motion control arm pivotally coupled to the wall interface and slidably coupled to the arm assembly through a friction control, wherein the friction control is selectively adjustable to increase and decrease sliding friction between the motion control arm and the arm assembly, thereby selectively limiting shifting of the arm assembly relative to the wall interface.

9. The television mount of claim 7, wherein the arm assembly comprises a single articulating arm.

10. The television mount of claim 7, wherein the arm assembly comprises a pair of articulating arms.

11. The television mount of claim 7, further comprising a tilt head assembly operably coupling the television interface and the arm assembly, wherein the tilt head assembly enables selective tilting of the television interface and an attached television relative to the arm assembly and wall interface.

12. The television mount of claim 11, wherein the television interface is selectively tiltable about a generally horizontal virtual tilt axis positioned forwardly from the television interface.

13. A television mount comprising:

a wall interface adapted to attach to a wall;

a television interface adapted to attach to a television;

an arm assembly having a pair of articulating arms, each articulating arm having a first end pivotally coupled to the wall interface and a second end pivotally coupled to the television interface;

a pair of motion control arms pivotally coupled to the wall interface, each one of the motion control arms slidably coupled to a separate one of the articulating arms through a separate friction control, wherein each friction control is selectively adjustable to increase and decrease sliding friction between the respective motion control arm and the articulating arm, thereby selectively limiting shifting of the articulating arm relative to the wall interface; and a pair of wrist motion controls, each wrist motion control operably coupled between a separate one of the articulating arms and the television interface, wherein the wrist motion control is selectively adjustable to increase and decrease friction between the television interface and the articulating arm, thereby selectively limiting shifting of the television interface relative to the articulating arm.

14. The television mount of claim 13, wherein each wrist motion control comprises a guide bracket defining a slot, the guide bracket operably coupled to the television interface, and a follower bracket attached to the respective articulating arm, a friction control extending through the slot and threaded into the articulating arm.

15. The television mount of claim 13, further comprising a tilt head assembly operably coupling the television interface and the articulating arms, wherein the tilt head assembly enables selective tilting of the television interface and an attached television relative to the articulating arms and the wall interface.

16. The television mount of claim 15, wherein the television interface is selectively tiltable about a generally horizontal virtual tilt axis positioned forwardly from the television interface.

* * * * *